(12) United States Patent
Shih

(10) Patent No.: US 6,226,370 B1
(45) Date of Patent: *May 1, 2001

(54) TELEPHONE PAGER AND INTERCOM SYSTEM

(76) Inventor: Lionel C. Shih, 5907 Amapola Dr., San Jose, CA (US) 95129

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,364

(22) Filed: Feb. 21, 1997

(51) Int. Cl.[7] .................................................. H04M 1/00
(52) U.S. Cl. ...................... 379/159; 379/167; 379/170; 379/171; 379/283; 379/386
(58) Field of Search .................................. 379/156–160, 379/167, 170–173, 164–165, 177, 179, 182–183, 386, 283

(56) References Cited

U.S. PATENT DOCUMENTS

| | | |
|---|---|---|
| 4,196,317 | 4/1980 | Bartelink . |
| 4,588,861 | 5/1986 | Teich . |
| 4,636,589 | 1/1987 | Lee . |
| 4,754,476 | 6/1988 | Rasmussen et al. . |
| 4,791,658 | 12/1988 | Simon et al. . |
| 4,794,640 | 12/1988 | Yeh . |
| 4,856,055 | 8/1989 | Schwartz . |
| 4,893,334 | 1/1990 | Parnello . |
| 4,899,378 | 2/1990 | Hamer . |
| 5,128,980 | 7/1992 | Choi . |
| 5,267,306 | * 11/1993 | Hagan .................................. 379/352 |
| 5,307,059 | 4/1994 | Connary et al. . |
| 5,339,254 | 8/1994 | Becker et al. . |
| 5,425,089 | * 6/1995 | Chan et al. ........................... 379/171 |
| 5,432,844 | * 7/1995 | Core et al. ........................... 379/171 |
| 5,594,788 | * 1/1997 | Lin et al. ............................. 379/167 |
| 5,612,994 | * 3/1997 | Chen ................................... 379/167 |
| 5,740,235 | * 4/1998 | Lester et al. ........................ 379/170 |

* cited by examiner

Primary Examiner—Duc Nguyen
(74) Attorney, Agent, or Firm—Claude A. S. Hamrick; Justin F. Boyce; Oppenheimer Wolff & Donnelly LLP

(57) ABSTRACT

A pager system connectable to the existing telephone wiring for activation through the normal residential DTMF telephone instruments, the system including a plurality of pager devices, each connected to the phone line between the tip and ring wires, and each pager including an identification circuit to allow it be individually addressed by a person using the phone, whether or not connection has been made through the central office. For use of the system, the keypad of the telephone instrument is used to enter a sequence of characters (e.g., symbols as well as numbers), which comprise an activation sequence. The DTMF activation sequence includes three parts: a header, a pager address (pager identification PID) and a signal identification (SID). The header portion is a sequence which is not used by the central office as part of its available services. The header portion is a system enabling signal that distinguishes the pager system from central office sequences. The pager address is a settable identification, unique to each pager to thereby differentiate pagers on the system. The pager address portion thus enables a particular pager (or pagers in certain modes). The signal identification portion is used to define which signal is to be produced on the selected pager(s). Intercom function may also be provided.

1 Claim, 12 Drawing Sheets

| Inputs | :State Variables /Outputs |
|---|---|
| SV3,SV2,SV1,SV0,SC2,SC1,SC0,CC!,CC0 | : RC1,RC0 |

| SC2 | SC1 | SC0 | : | SC STATES |
|---|---|---|---|---|
| 1 | 1 | 1 | : | P |
| 1 | 1 | 0 | : | T |
| 1 | 0 | 1 | : | R1 |
| 1 | 0 | 0 | : | R2 |
| 0 | 1 | 1 | : | Q3 |
| 0 | 1 | 0 | : | Q2 |
| 0 | 0 | 1 | : | S |
| 0 | 0 | 0 | : | Q1 |

| SV2 | SV1 | SV0 | : | SV CODES |
|---|---|---|---|---|
| 1 | 1 | 1 | : | '0' |
| 1 | 1 | 0 | : | '1' |
| 1 | 0 | 1 | : | '2' |
| 1 | 0 | 0 | : | '3' |
| 0 | 1 | 1 | : | '4' |
| 0 | 1 | 0 | : | '5' |
| 0 | 0 | 0 | : | '7' |

TELEPHONE PAGER AND INTERCOM SYSTEM

BACKGROUND OF THE INVENTION

The background of the invention will be discussed in two parts.

1. Field of the Invention

The present invention relates to a pager system for use on the premises of a telephone subscriber utilizing the existing telephone wiring and telephone sets with DTMF (tone) dialing capability, with provision for an intercom function.

2. Description of the Prior Art

Home telephones have become indispensable in normal daily living for providing connections to the outside world. In the United States, within the past twenty-five years telephone wires have been pre-wired into virtually every room of every newly built residence, be it a home or apartment. Such wiring for households has normally provided capability for multiple telephone instruments with telephone connections provided in different rooms and areas for access and convenience. Yet, when it comes to providing communication between people in the same household with multiple telephone instruments, those telephones, though conveniently located and accessible, are not very useful for that purpose.

With respect to the telephone system in the residence, multiple telephone instruments on the same phone loop line can not be rung individually, that is, an incoming call rings at all instruments on the same local loop line. As a consequence, when one occupant answers the phone, only to discover that the call is for another occupant in another part of the residence, in the absence of an intercom system, there is no convenient way to notify the other party to pick up the phone. Furthermore, since telephones on the same phone loop line can not be rung individually, it has become a fundamental inconvenience in the case of multiple persons sharing one phone line with two or more telephones at different locations. A person answering a phone call bears the burden of locating the person for whom the phone call is intended. The available methods for that could be anything such as yelling or walking around. The conventional residential telephone instrument itself provides no assistance in this task.

U.S. Pat. No 4,899,378 to Hamer discloses an in-home voice announcement device that can be activated by a single tone pair of the residential telephone instruments. However, since it is effectively a voice broadcast system, it does not allow any selection of the audience. In other words, even if the whereabouts of the target person is known, the paging will be delivered to all available points, and thus disturb everybody on the premises, without discrimination. While general voice paging allows meaningful message dissemination, it has to work with an amplifier/speaker system of reasonable quality to make the voice message legible. Yet, it may still be difficult to hear in a noisy environment.

Separate intercom systems have been utilized for communication between different persons in different rooms in the same household. However, such intercom systems are totally separate and require separate wiring, that is, separate from the telephone wiring. Most dedicated intercom systems provide basically the same general paging function but still lack addressability, that is, most residential voice paging systems, such as intercom systems, are likewise announced to all intercom stations. Additionally, such systems tend to be very expensive, particularly if they are installed after the residence has been constructed. Furthermore, such intercom units are wall mounted and are less convenient for access compared to telephone instruments.

At one time, local telephone companies offered a service called Intercom, which allowed a subscriber to use the phones as an intercom. To use it, the subscriber picked up the phone and dialed one of three ring pattern choices: #51, #52 or #53. These ring patterns will connect to the central office (CO), Then the central office would ring all of the on-hook phones on the same phone line with the chosen one of the three different patterns. When the paged party picked up the phone, the intercom function could then be carried out over the telephone instruments. While this allowed a little flexibility, its coverage still included the entire premises, i.e., all phones would ring. In addition, the intercom function would not work if a connection had already been made through the CO (central office with another subscriber's phone). In other words, if a call came in to a residence, and the phone was answered, the intercom function for the phone could not then be used. Of course, for such local telephone company service, there was an installation charge and a monthly charge for the service per phone line.

A shared line telephone answering system is shown and described in U.S. Pat. No. 5,432,844, in which system there is used a master telephone answering device and extension telephone answering devices, one for each other phone in the residence. If a telephone call is answered by someone, others nearby may be paged through the extension telephone answering device from any telephone. Such a system requires a telephone answering device at each phone, thereby necessitating a large expenditure.

Other intercom systems which are usable in residential environments and do make use of at least some of the existing telephone networks are known in the prior art such as U.S. Pat. No. 4,588,861 to Teich, and U.S. Pat. No. 4,196,317 to Bartelink. However, in addition to other deficiencies, both of these systems require the use of the other two wires on the same RJ11 telephone socket.

It is a feature of the present invention to provide a new and improved residential pager system utilizing the existing ring and tip telephone wiring in a home with conventional DTMF telephone instruments.

Another feature of the present invention is to provide a pager system which is selectively addressable to a given area or to a single selected room, out of two or more areas or rooms.

Another aspect of the invention is to provide a unique addressing system for the pager which address has provision for selection of distinctive signals, unique to each occupant, as well as unique to a specific room or area location.

Still another feature of the present invention is to provide a pager system which, when used in conjunction with telephone instruments, becomes an intercom system utilizing the two telephone subscriber wires.

Yet another feature of the present invention is the incorporation of the pager function into the telephone instrument itself.

SUMMARY OF THE INVENTION

The foregoing and other aspects of the invention are accomplished by providing a pager system connectable to the existing telephone wiring for activation through the normal residential DTMF telephone instruments, whether the residential system includes one or multiple telephone instruments on one telephone loop line. The pager system may also be used with a local loop telephone system which includes at least one additional telephone instrument on a separate telephone line. The pager system allows a user, on receipt of an incoming call, to page the individual desired, through the telephone instrument just answered, while the caller is still on the line, and with the telephone off-hook, so that the paged person may be informed of the call and answer the phone.

A pager device at each telephone instrument provides the pager function on regular 2-line subscriber phone lines. All pager devices are structurally and functionally identical. The pager device connects to the phone line between the tip and ring wires, and includes an identification circuit to allow it be individually addressed by any person within the residence. Another aspect allows the circuit to be overridden to provide a broadcast mode. The device can also produce different audible signals as well as a visual display as matching sequences or codes are received. Provision is made for coupling to other sets of phone lines in the residence when more than one subscriber number is available. Each device at a different station is provided with a unique pager identification, as well as additional identification to avoid false triggering of a similar paging device connected to the same phone lines. For paging a given individual, a distinct signal may be provided.

For use of the system, the keypad of the telephone instrument is used to enter a sequence of characters (i.e., symbols as well as numbers), which comprise a pager activation sequence. The activation sequence includes three parts: a header, a pager address (pager identification PID) and a signal identification (SID). The header portion is a sequence which is distinguishable from a central office reserved telephone sequence, that is, the header is a sequence which is not used by the central office as part of its available services. The header portion is a system enabling signal that distinguishes the pager system sequence from central office sequences. The pager address is a settable identification, unique to each pager to thereby differentiate pagers on the system. The pager address portion thus enables a particular pager (or pagers in certain modes). The signal identification portion is used to define which signal is to be produced on the selected pager(s). By way of example, a header sequence may comprise the three keypad characters ##8, that is, a sequence of two pound symbols followed by the numeral 8. The keypad is then used to enter the pager address as the next part of the activation sequence, which may be, for example, one numeral or three numerals. For a one numeral entry as part of the activation sequence, the numeral can identify a room or an area, for example, a bedroom or the patio area. For larger systems use of the three numeral PID is preferred, with the first two identifying an area and the third a room within the area. The third part of the activation sequence determines the signal to be transmitted, that is, in a given embodiment, an audible tone comprised of two or more different frequencies, individually or mixed, in varying bursts with or without intervening short intervals of silence.

In operation, from any given DTMF phone instrument, the user can enter a multiple DTMF tone sequence that contains a code unique to the desired intended recipient, by room, telephone instrument or area, and an audible signal representative of the coded input will be received at the intended station. In an alternate embodiment, a DTMF adaptor is provided for mounting the pagers of the alternate embodiment on existing household AC power sockets.

Activating the pagers is accomplished by using the touch tone dial pad of the instrument to transmit a predefined multiple DTMF signal sequence. Combined with the pager identification address, which is user assignable to each pager, and the pager's capability of generating different signals on command, the present invention supports different modes of paging, such as Location-Specific, Signal-Specific, Location & Signal-Specific, and Broadcast pager paging modes.

Another aspect is the provision of an Intercom Assist circuit function using the telephone instruments. Upon detection of a dial tone and an off-hook condition, and a valid header, the circuitry switches the central office out of the local loop to permit local intercom usage without the central office messages normally accompanying an off-hook condition of the telephone.

Other objects, features and advantages of the invention will become apparent on a reading of the specification when taken in conjunction with the drawings in which like reference numerals refer to like elements in the several views.

DESCRIPTION OF THE PREFERRED EMBODIMENT

Figure 1:
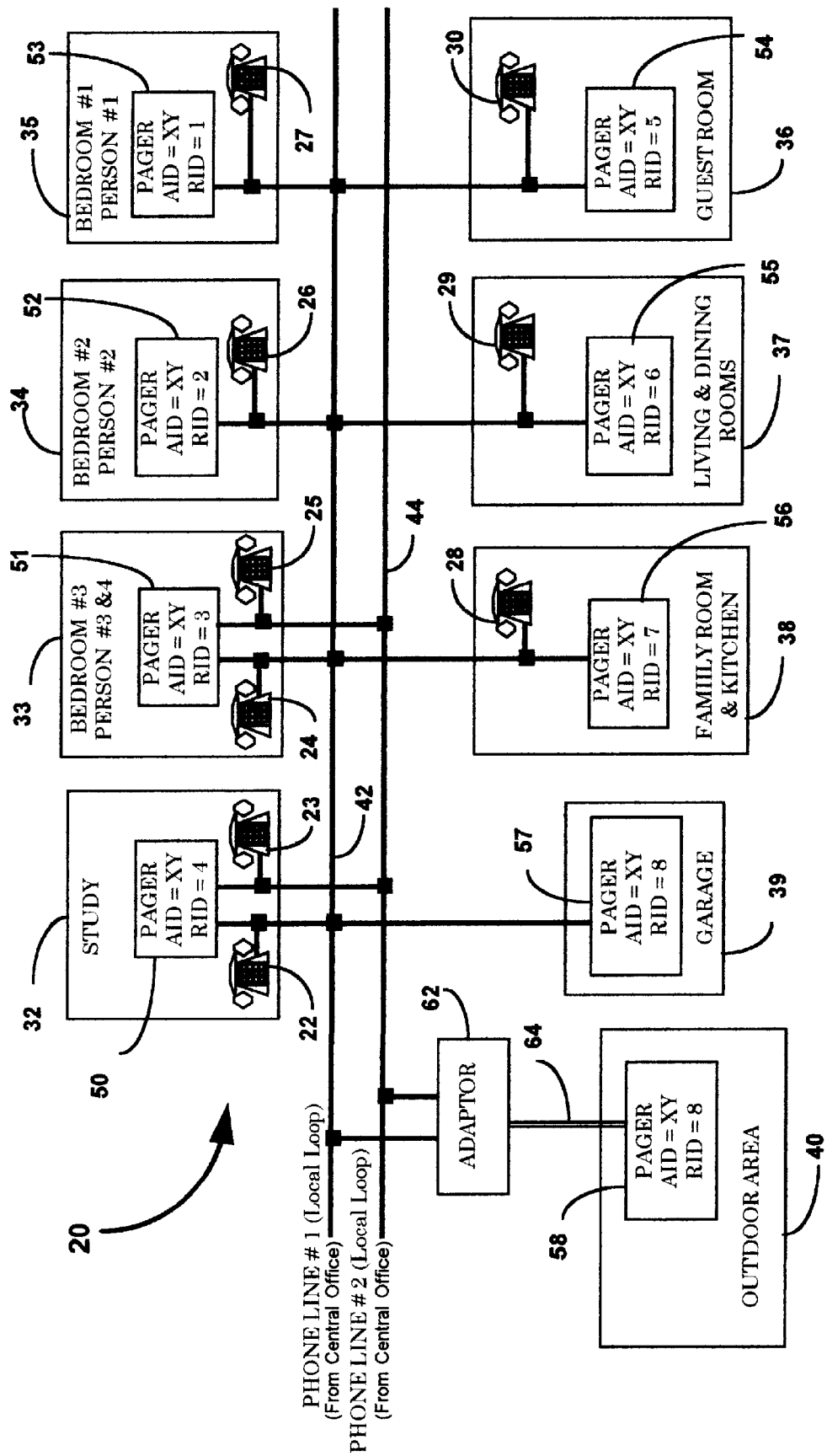
FIG. 1 is a system block diagram of the telephone pager system according to the invention.

Referring now to the drawings, and particularly to FIG. 1, there is shown a telephone intercom and pager system, generally designated 20, in which a plurality of telephone instruments 22–30 are located in different areas or rooms, 32–38, respectively, within the residence. Each of the blocks 32–38 includes a designation of an example area/room within a residence. For blocks 33, 34 and 35, person number assignments are also given for the individual occupying that room. The instruments 22–30 are connected to one of two 2-wire residential telephone lines 40, 42. The system shown presupposes two subscriber telephone numbers connected through the central office (CO), one on Phone Line 1 and the other on Phone Line 2, with different instruments 22–30 connected to one or more lines. Each phone line comprises a local loop within the residence.

Each of the rooms 32–38 is designated by a rectangle, with two additional rectangles 39, 40 being shown, these being the garage and outdoor area, respectively. These last two areas are not shown with telephone instruments but are designated paging areas, as will be discussed. For purposes of description, each of these areas or rooms will be referred to as a station. At each station, there is a pager device 50–58, inclusive, with the pager device connected to the appropriate one of the two telephone lines (or both as in the case of rooms 32 and 33), each of which is provided with two telephone instruments, each with its own subscriber telephone number.

The outdoor area 40 is provided with an adapter 62 which, as will be described later, is connected to the AC power line for the residence for transmission of signals through the power lines within the house, with the adapter then being connected via line 64 to the pager device 58. It is to be noted that the outdoor area 40 and the garage 39 are provided with basically the same functionality as those without the adaptor 62.

Figure 2:
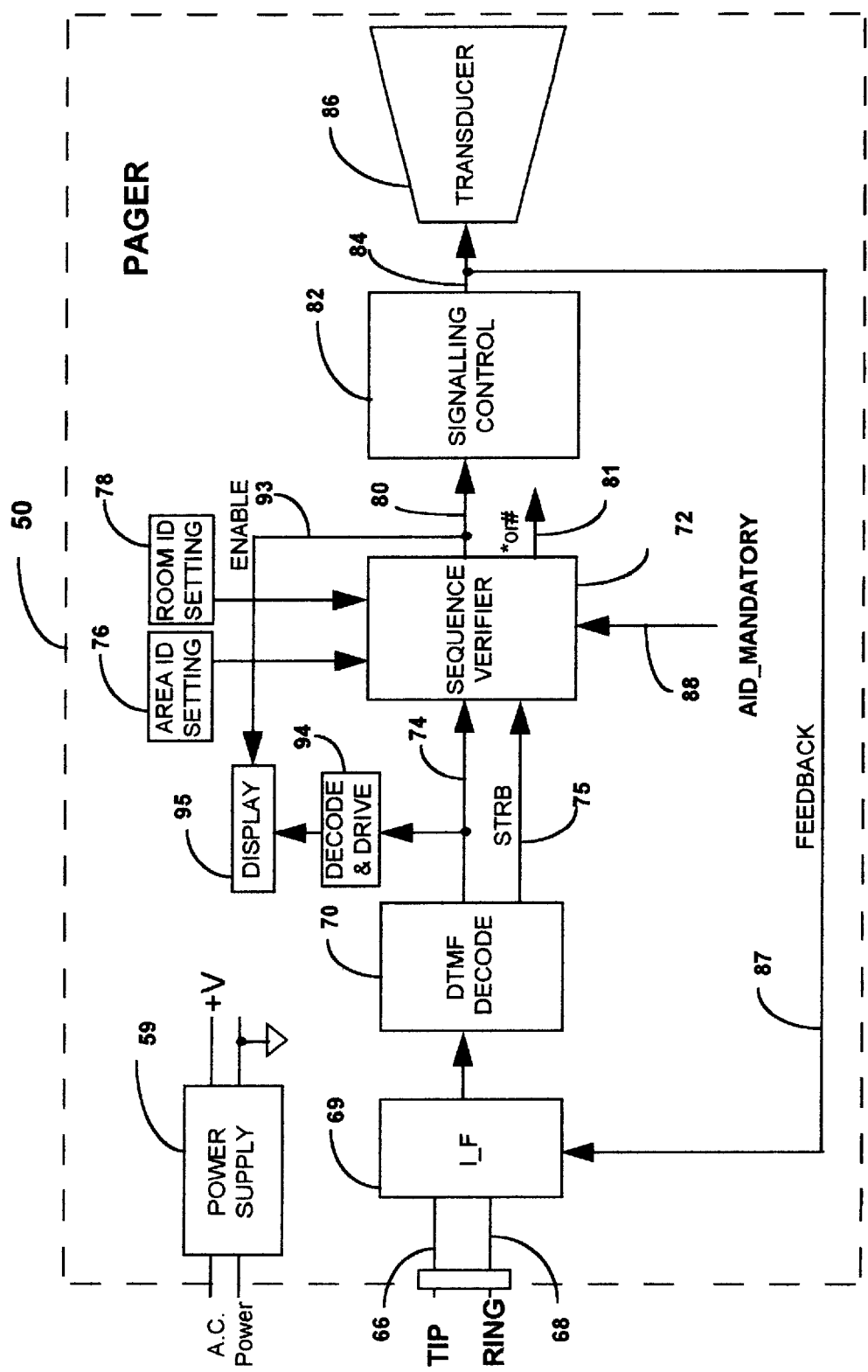
FIG. 2 is a functional block diagram of one embodiment of a pager device, used in the system of FIG. 1, for attachment to the subscriber telephone wiring for use with a telephone instrument.

As will become apparent, the pager 50 of the present invention is a self-contained, separately powered device that passively monitors the DTMF signals or its equivalent when connected directly or indirectly to the typical 2-line 66, 68 (Tip-Ring) subscriber's phone line (See also FIG. 2). When certain sequences of DTMF (or equivalent) signals are detected, it generates the above-described paging signals. One of the basic advantages of this present invention is to provide a signaling system using the existing home phone systems, along with the noise immune DTMF dialing, plus a properly designed signal sequence set, which provides an activation sequence that would rarely, if ever, mistrigger. Furthermore, since the system operates over the residential phone lines, when a caller from the outside makes connection with an answering machine or a device that can auto-answer an incoming phone call, the resident can use the pager to screen calls by letting calls auto-answer first. If the caller knows the addresses of the pagers in that house, he/she can use the resident's pager to reach a particular phone that is accompanied by a pager which also has a unique address known to the caller. In fact, the caller will have the exact same paging choices just as if he/she is present on the premises.

Within each pager device, there are notations, such as AID and RID, which refer to Area Identification and Room Identification, respectively, with each room identification (RID) being uniquely assigned. In the preferred embodiment of the system described above the Area ID (AID) and the Room ID (RID) together make up the Pager Identification (PID). The AID in this embodiment is a two-digit ID, the value of which can be from 00 to 99. The RID is a single digit ID of value from 0 to 9. As the names imply, the AID is meant to cover an area while the RID covers rooms. The purpose of breaking up the PID into two parts is to provide flexibility. For a typical residential home, the RID alone is sufficient to cover all the rooms/areas that need different addresses. Thus, the AID can be used as the house address such that all the pagers have the same AID value. This provides a layer of security to prevent unwanted paging from outside callers. For a household that requires more than 9 RID's, i.e., 0–8, the AID can serve as an extension to the RID to increase the addressability range. In the present embodiment, the RID of 9 is reserved as a special code that is meant for providing a broadcast function, that is, all the pagers, regardless of the RID, will be activated when the value of '9'is received.

The present embodiment also allows two different activation sequences. A short one only uses the RID (i.e., a single digit) while a longer one uses both the AID and RID (i.e., a sequence of three digits) to qualify for the activation. The use of the short activation sequence can be blocked manually or automatically when a call is originated from outside. The details for auto blocking a short activation sequence are not shown since the design would be readily apparent to one skilled in the art based on the present disclosure. However, when the long sequence is used, only those pagers with the same AID can be broadcast together. When a short sequence is elected, all the pagers do not use the AID portion to qualify for activation. Therefore broadcast activates all pagers, even with different AID's. The AID and RID lengths are limited only by the discrete logic implementation used in this particular embodiment. If a microcontroller is used, it would still offer a low cost but with the capability of expanding the ID range limit.

At this point, there will now be described the concept of the DTMF dialing activation sequence that is essential to the present invention and necessary for understanding of the functional block diagram to be described hereinafter. The selection of the DTMF activation sequences allows the use of the same phone line to address pagers with a minimized possibility of false triggering of other phone equipment on the same phone line, including the CO (central office). It also defines the pager message signal to be delivered by the selected pagers in coded form. The special DTMF sequences also allow the phone lines and its phone equipment to be used as an intercom system without any modifications because those DTMF sequences only trigger pagers (but not the CO) to make any connections. However, users have to become accustomed to the voice message or beeps sent by the CO when it detects these special DTMF sequences. This can be alleviated by another feature, designated as the Intercom Assist, which is enabled by the design of special DTMF sequences used in the present invention. This feature automatically detects the activation for an intercom use, and thus switches the CO out of the connection to avoid its voice messages or beeps. The details of this feature will be described later after discussion of the pager of the invention.

By way of example, and using the room ID assignments shown in FIG. 1 as examples, the directory for the pager can be shown in the table below. In the table, the pager address includes the area identification (AID0 and AID1) as well as the room identification (RID). The RID and the SID are shown in the respective columns therebelow. The XY designation includes two numerals unique to an area within or about the residence.

| #.##X        Y          RID | SID |
|---|---|
| AID1  AID0  \|            | \| |
| (or * . . . * *)    V     | V |
| 0: Other common areas | 0: Common Paging |
| 1: son's room | 1: son |
| 2: daughter's room | 2: daughter |
| 3: dad & mom's room | 3: dad |
| 4: Study | 4: mom |
| 5: Guest Room | 5: |
| 6: Living & Dining rooms | 6: ------------- |
| 7: Family Room | 7: ------------- |
| 8: Garage & Backyard | 8: ------------- |
| 9: BROADCAST | 9: EMERGENCY |

For a location-specific paging to the Family room, one would send either "###XY60" or "***60", such that the Common Paging signal may be delivered by the pager located in the Family Room. If mom is needed and she is believed to be in her room, the sequence "###XY34"(or "* . . 34") would be used. In this case, the signal number or SID 4 for mom will be delivered by the pager with its AID="XY" and RID="3"(or any pager with RID="3") which is in room #3 in this example. If this is not successful, paging to the Study, Living&Dining Room, Family Room, and Garage & Backyard may be done by replacing the "3"(RID) with 4, 6, 7 and 8, respectively. The last resort is to broadcast to the whole premises by using "###XY94" such that the Signal #4 will be delivered by all pagers with AID="XY". This is an example of a signal-specific broadcast mode of operation, that is numeral "9" designates "broadcast"(RID) while numeral "4" designates mom (SID). The sequence "*94" may also be used, but it will activate all the pagers on the premises regardless of their AID's, that is, the pound symbol is specific and the star symbol is general or acts as an override. In fact, if the paging is done when the CO connection is active, pagers on the other end of the CO connection will also be activated to deliver signal number 4.

In the case of signaling an emergency from daughter to dad, the daughter can try dad's room first by sending "###XY39" or "*39". Or by broadcasting the emergency throughout the premises using ###XY99" or "*99". The emergency signal is not directed to any particular individual, it is meant to be a request to each and every one who heard the paging to pick up the phone. Use of the SID to identify the called party is just one example of its usage. It may also be used to identify the caller, depending on the user's need.

Referring now to FIG. 2, there is shown a functional block diagram of the functions associated with each station, that is the functions performed by a pager device, enclosed in broken lines and generally designated 50 (it being understood that the other pager devices 51–58 are the same). A power supply 59 is shown in the upper left of the block 50 for providing power to the individual components therein. At the left of the figure, there are shown the normal individual telephone subscriber lines 66, 68, which are designated Tip and Ring, these two lines essentially making up each of the telephone line pairs 42 and 44 shown in FIG. 1. The individual lines 66, 68 are the lines to which the telephone instrument is connected for service through the central office of the telephone service system.

Connected to the lines 66, 68 is the block 69 designated I—F (Interface) which functions to provide the necessary electrical circuitry needed to establish interface between the telephone line and the rest of circuitry in the pager 50. The properly interfaced signal is then sent to the DTMF decode receiver 70, which provides the proper signal conditioning and filtering to detect and decode a DTMF signal. Each qualified and decoded DTMF signal is presented as a 4-bit binary code to the Sequence Verifier block 72 over line 74 (along with a strobe STRB signal on line 75), and block 72 verifies whether the received DTMF signal sequence qualifies to activate the pager 50. The verification includes the comparison of the received pager address (PA) with the area identification (AID) from the AID setting 76 and room identification (RID) setting 78 of the pager 50.

If the sequence verification is successful, the output of the sequence verifier 72 on line 80 enables and defines which one of the several signals is to be delivered by the pager. The signals over line 80 are supplied to the signaling control block 82 which controls the duration, the frequency contents and the number of repetitions of each signal deliverable by the pager and generates the signal based on the output of the sequence verifier 72. The output of the signaling control is fed back to the interface circuit 69 over line 87 and transmitted via line 84 to a suitable audio reproducing transducer 86, which may be a buzzer, a speaker or the like. Alternatively, the transducer may be a light or LED source, or both a light and an audible signal.

Functionally, the sequence verifier 72 takes the DTMF signal in its encoded form as one of its inputs. The other inputs of sequence verifier 72 include the PID [from both blocks 76 (AID) and 78 (RID)] and a signal designated A_M (AID mandatory) on line 88. The PID can be a multiple-digit code while the A_M is a single line signal that disables or enables part of the PID code as a mandatory portion of the verification sequence. For each validated DTMF signal, the Sequence Verifier 72 checks whether the signal fits into one of the permitted signal sequences. This fit includes matching of the received DTMF signal with the one of the PID digits depending on its corresponding location in the signal sequence.

For a visual indication, a 7-segment LED display 95 is provided, which receives the decoded signal from the output of the DTMF decoder 70 on line 74 through a decoder and driver circuit 94, while being enabled on line 93 by the sequence verifier output on lead 80. In this manner, the additional visual display 95 can display the digits received by an enabled pager 50. Functionality can be added so that the last one or more digits provide the identification of the calling party, which is displayed on the display 95. The display 95 can be constructed to display all digits received or only the last digits indicative of the calling party. In the latter case, these last digits will be latched and displayed. Using the assignments in the table shown above for illustration purposes, the emergency paging from the daughter may be dialed as "###XY992". While all the pagers are signaling the emergency signal, the displays 95 at the receiving stations will display "2", thus identifying the caller as the daughter.

Any pager 50 (or 51–58) is activated when it receives a valid sequence of DTMF signals that contains the PID of the selected pager at the proper location in the sequence. An activated pager uses its built-in signaling control function 82 to produce a specific audible and/or visual signal, defined as part of the activation, as the means to summon or alert one or more individuals at the designated location.

The DTMF signal sequences used in the preferred embodiment consist of three parts: a header, a pager address (PA) and a Signal ID (SID). The header is the first part of an activation sequence. It has to be different enough from a regular dialing sequence used on a phone line for connecting through the CO to avoid or minimize false activation. By way of example, telephone companies utilize certain sequences in which the first part of the sequence is the star symbol (*), such as *69 for call back of the last incoming number or *82 for enabling the caller's phone number to be transmitted for Caller ID systems. These sequences will be referred to as telephone company system reserved sequences which are avoided in the present system. Acceptable sequences in the present invention can include, by way of example, multiple pound symbols (#) followed by any combination of digits or characters, or the like. The header can also be used to define the sequence format to follow. Thus different headers can provide different activation sequences for different situations. For instance, one header may allow a shorter activation sequence for quick dialing while another header may require a longer activation for more selections or security. The second part of the activation sequence is the PA part. It is used to select (or address) a pager or pagers for activation. Its length may vary depending on the preceding header. A pager 50–58 as described herein is assigned with a unique Pager ID (PID). If the PA portion of the activation sequence matches with the pager PID, the pager is selected for activation. If the pager is activated, it delivers the signal according to the last part of an activation sequence, i.e. the SID, if it is valid.

The capability of producing different signals on command has unique importance to the pager 50 of the present invention. First, it makes the pager a self-contained signaling device such that, once it is plugged into the supported medium, all that is needed is the means to generate the activation sequences. Second, it allows the user to choose different modes of paging. For instance, one signal can be assigned for the "location-specific" paging; a different signal for emergency use, and other signals can be assigned to a person or a group of persons or other meanings for "signal-specific" paging. The signals themselves can be as simple as audible buzzes, and/or visual or even as complex as "predefined" voice messages. When all combined, the pager system can support multiple paging modes: namely, the location-specific paging, signal-specific paging, location & signal specific paging, and broadcast paging.

Location-specific paging is used to signal all persons at a particular location. Signal-specific paging can be broadcast to all the pagers on the premises. The system can also be combined with the "location-specific" feature that directs the "signal-specific" paging to a particular location or locations to prevent disturbing other locations. As previously discussed, one signal may be reserved as an emergency signal for broadcast during an emergency.

In the preferred embodiment, two kinds of non-telephone company reserved sequence headers are used. The first kind of header is made up of two or more consecutive "*" signals, that is the asterisk or "star" symbol on the telephone dial. Following this kind of header will be the RID and the SID. This is also referred to as the "short sequence" from time to time. The second kind of header is made of two or more consecutive "#" signals, that is, the "pound" sign on the dial. Following this type of header will be the AID, the RID and the SID. This is called the "long sequence".

Figure 3:
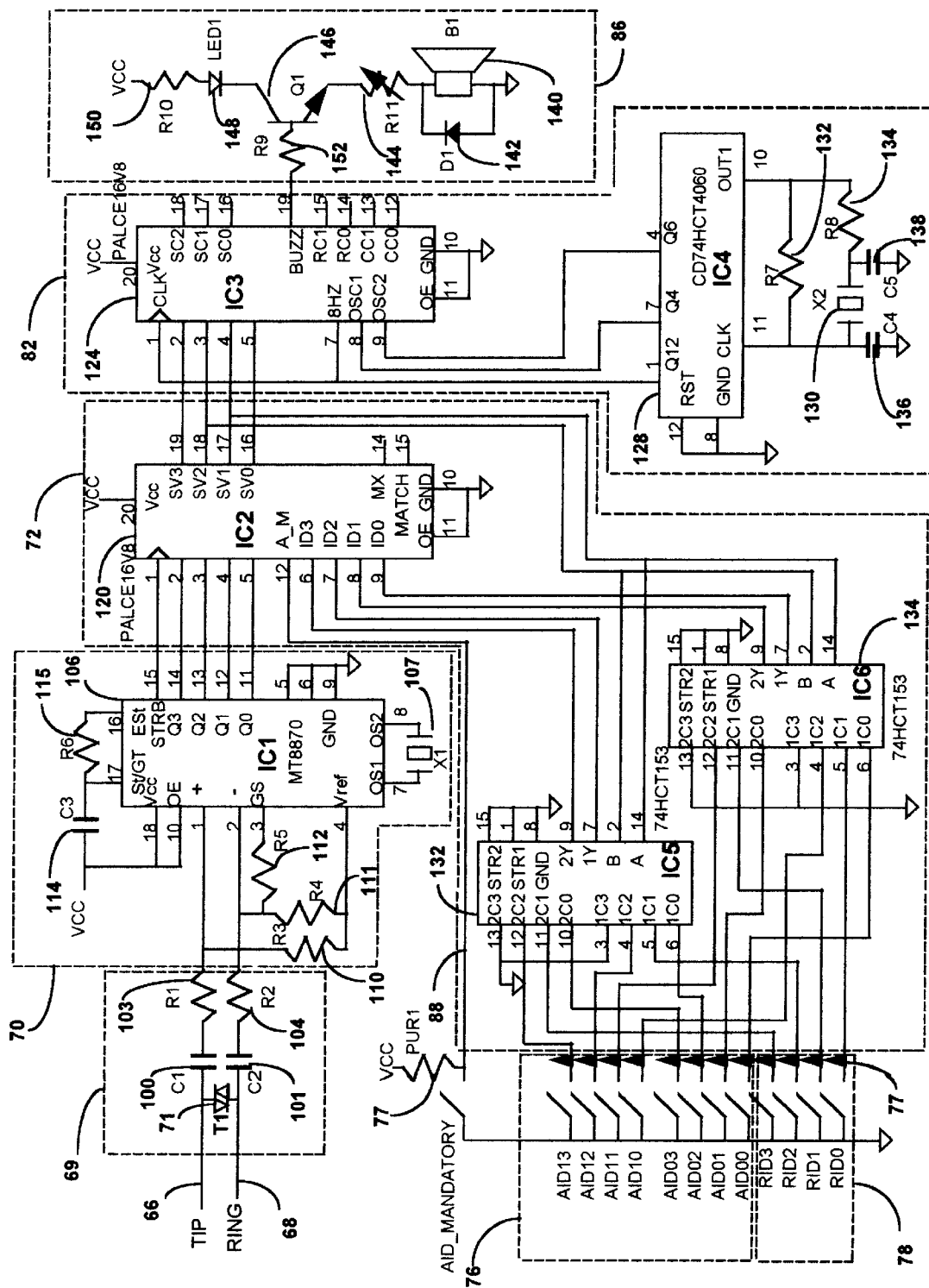
FIG. 3 is a schematic diagram of a pager device used in the pager system of FIG. 1, operating in accordance with the functional block diagram of FIG. 2, with the power supply and feedback functions omitted for ease of illustration.

Referring now to FIG. 3, the details pertaining to the circuitry comprising the pager 50 will be described. In FIG. 3, certain portions are shown as being enclosed in broken lines, with each portion bearing a reference numeral corresponding to the functional block portions shown in FIG. 2.

In FIG. 3, between the Tip line 66 and the Ring line 68, a transorb device T1 interconnects the two to provide protection for the pager 50 from the hazardous conditions which normally occur on telephone lines. Line 66 is in series circuit with a capacitor 100 (C1) and a resistor 103; similarly line 68 is in series circuit relation with a capacitor 101 (C2) and a resistor 104 (R2). These components T1, C1, R1, C2, R2 form the interface function (block 69 in FIG. 2) to the phone line in the differential configuration. Capacitors C1 and C2 block the DC from the phone line. With C1 of 0.01 microfarad and R1(R2) of 100K ohms, the equivalent impedance is in excess of 100K ohms which is considerably higher than the AC impedance allowed as a load on a telephone line.

As part of the decoder 70, the integrated circuit 106 (IC1) is a DTMF receiver IC, such as the MT8870 produced by Teltone, Inc., and provides the necessary filtering and decoding of a signal received at pins 1 and 2 from the phone lines to detect a DTMF signal. The 3.57189 MHz crystal 107 connected to pins 7 and 8 of IC1 is used to detect the two tones in a DTMF signal with great accuracy. A first resistor 110 (R3) is connected between tip line 66 and pin 4, while a second resistor 111 (R4) is connected between the ring line 68 and pin 4, and a third resistor 112 (R5) is connected between the ring line 68 and pin 3 of IC1. The resistors R3, R4 and R5 establish the gain, via the gain select (GS) pin for the differential amplifier in IC1. Upon detecting a DTMF signal, IC1 presents the signal in a decoded four bit binary form at output pins 11–14 (Q0 through Q3) of IC1. Internally, IC1 106 further validates the signal with a duration test to avoid mis-registering of spurious signals. The duration is determined by capacitor 114 (C3) and resistor 115 (R6) that are connected in series between the voltage source Vcc and pins 17 and 16. When a DTMF signal passes the duration test, IC1 asserts the strobe signal (STRB) at pin 15 to a high level. This strobe signal stays asserted until the detected DTMF signal is no longer present. The output signals of IC1 are permanently enabled by connecting the Output Enable (OE) signal at pin 10 to the Vcc voltage level.

Figure 4:
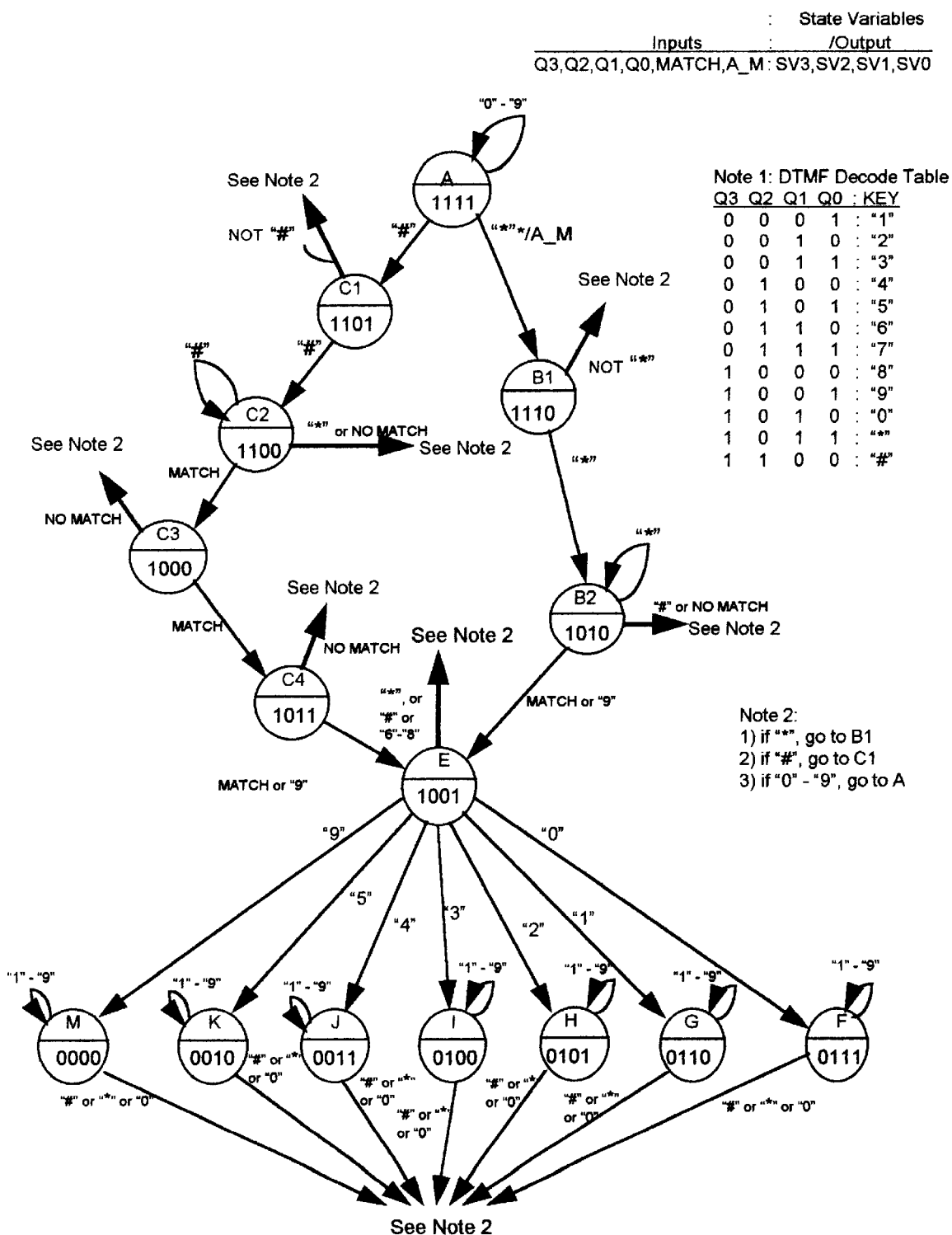
FIGS. 4 through 7 are the state transition diagrams of four state machines shown in the schematic diagram of FIG. 3.

The four bit output of IC1 (Q0–Q3) is fed to pins 2 through 5 of a second integrated circuit 120 (IC2), which is a programmable-array-logic IC device (PALCE16V8), forming part of sequence verifier 72, and is used to provide a first state machine (SM1) whose state transition diagram is shown in FIG. 4, which will be discussed later. The outputs of the state machine 120 are a first set of outputs at leads 16–19 identified as SV0–SV3; and a four bit input at leads 6 through 9 (identified as ID3, ID2, ID1 and ID0). IC1 also has, as an input, the signal A_M (AID mandatory, which appears at lead 88 of FIG. 2 as an input to the sequence verifier 72).

A pair of like integrated circuits 132 and 134 (IC5 and IC6, respectively) are utilized to provide the identification sequences utilized in the pager 50. IC5 and IC6 in FIG. 3 are dual 4-input multiplexer IC's (74HCT153) whose multiplexing function is controlled by two output signals, SV2 and SV1, of the state machine 120, which are provided to IC5 and ICC6 at the A and B inputs thereof. In fact, there are only three inputs being multiplexed and they are the AID1, AID0 (collectively area ID setting 78 of FIG. 2) and RID (room ID setting of FIG. 2).

Figure 5:
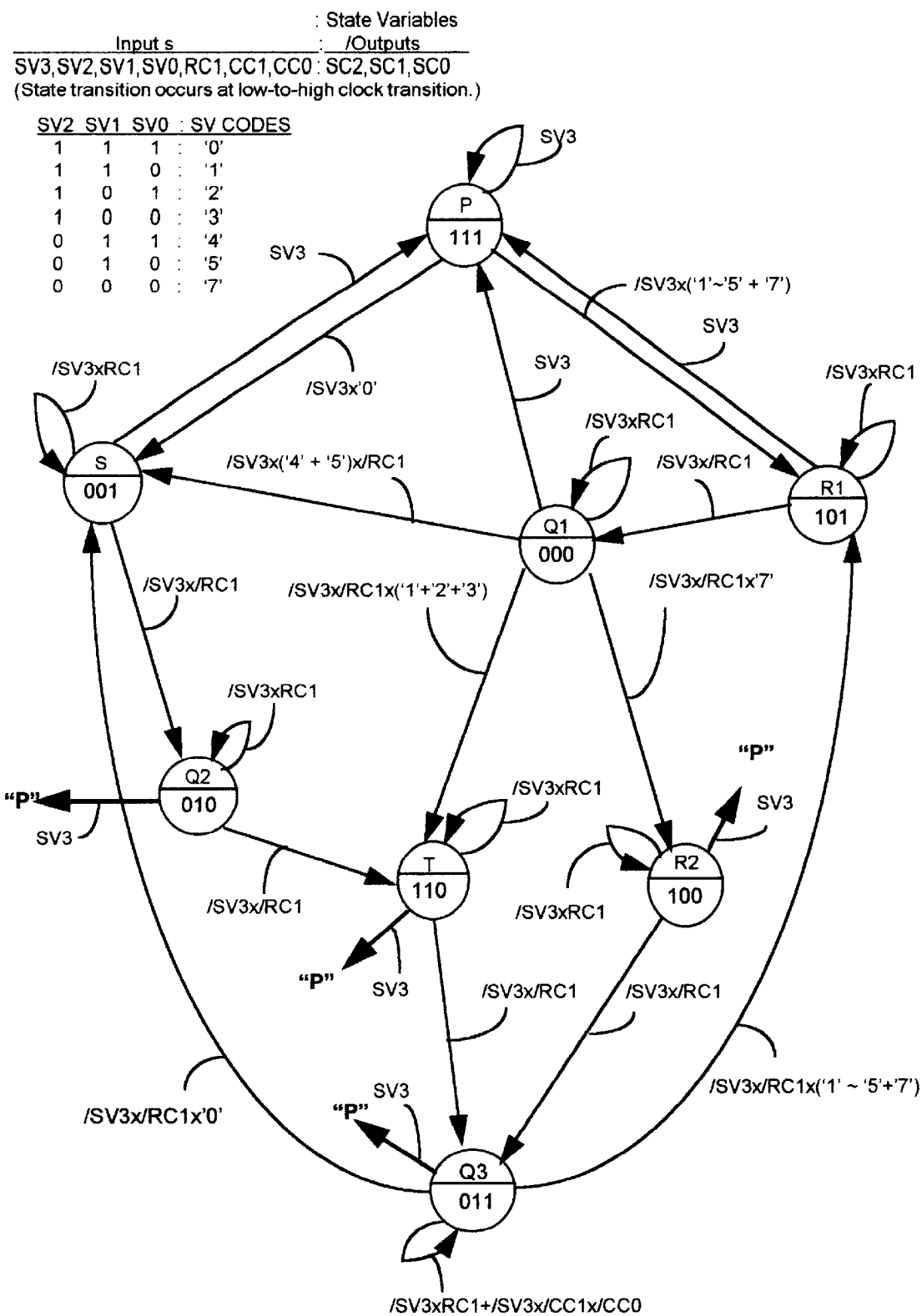
Figure 6:
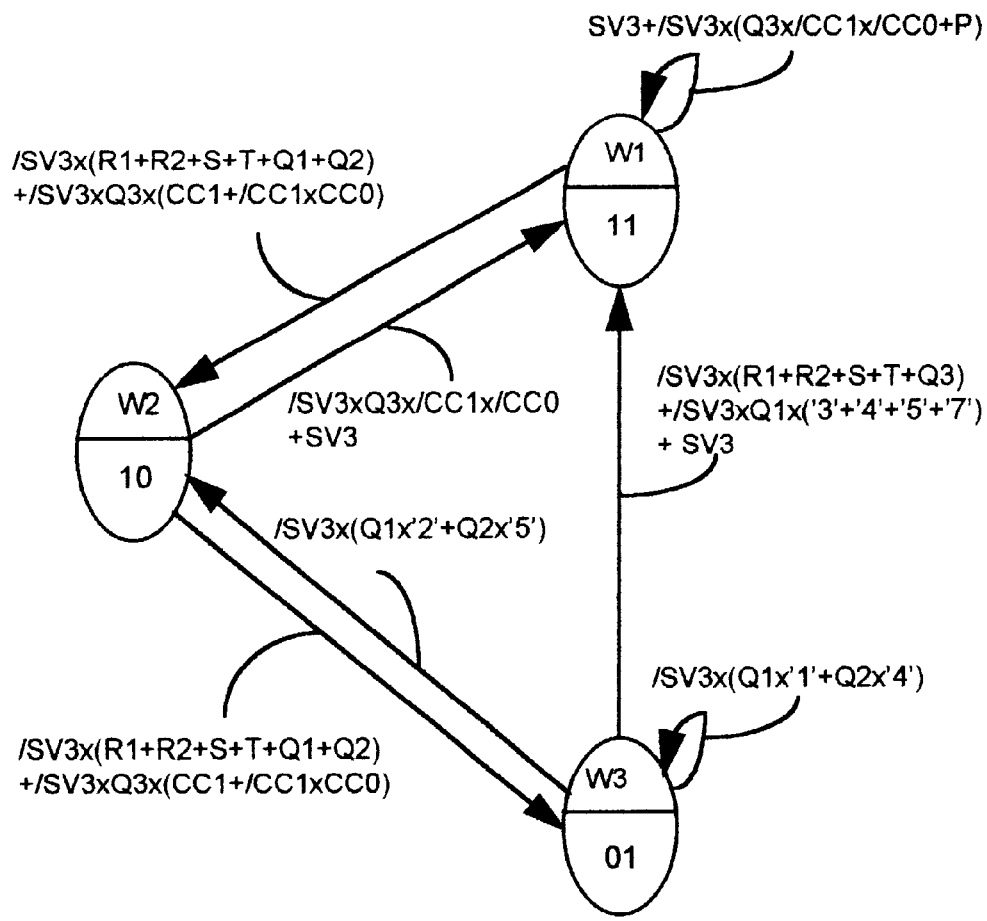
Figure 7:
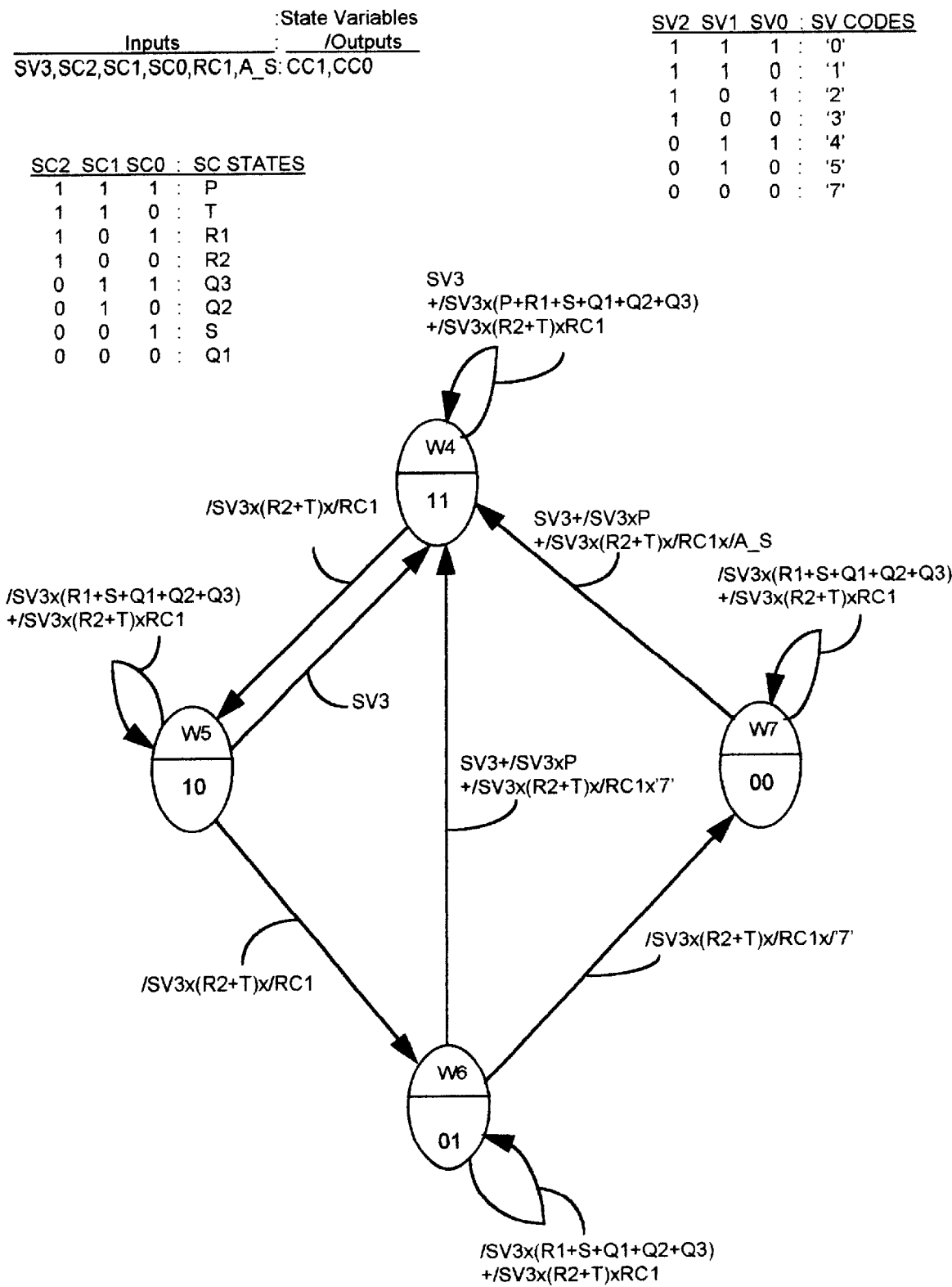

With respect to the signaling control function 82, the four bit output SV0–SV3 are applied to the input pins 5, 4, 3 and 2 of IC3 124, which contains the state machines SM2, SM3 and SM4, the state transition diagrams therefor being shown in FIGS. 5, 6 and 7, respectively, and will be discussed hereinafter. Device 124 (IC3) depicts several pins which have no external connections, one set of pins 16–18, being designated SC0, SC1 and SC2, respectively; a second set of pins 14, 15 being designated RC0 and RC1, respectively; and the third set of pins 12, 13 being designated CC0 and CC1, respectively. These sets of pins are internal only with the designations thereon being for reference purposes in conjunction with the description of the state transition diagrams to be discussed.

Device 124 (IC3) receives its clock (CLK), 8 Hz, OSC1 and OSC2 signals from an integrated circuit 128 (IC4), which is a 14-stage binary counter IC with built-in oscillator circuitry. Its oscillator input pins 11 and 10 are connected to an approximately 32 KHz crystal 130 and its associated resistor/capacitor network consisting of resistor 132 (R7), resistor 134 (R8), capacitor 136 (C4), and capacitor 138 (C5). Both the clock and 8 Hz signals to IC3 are from pin 1 of IC4, an 8 Hz signal derived from the 12th stage of IC4. The OSC1 and OSC2 signals at pins 8 and 9, respectively, of IC3 are at 2 KHz and 512 Hz, respectively. For signaling purpose, the 2 KHz signal produces a high pitch sound through the buzzer 130. When mixed with the 512 Hz signal, the combined signal produces a more pleasant chirping sound. The combined outputs appear at pin 19 (BUZZ) of IC3.

The transducer function 86 includes a speaker 140 (B1) with diode 142 connected across the input leads, with one lead connected to ground and the other lead connected through variable resistor R11 or volume control 144 to the emitter of transistor 146 (Q1), the collector of which is connected to the cathode of light-emitting diode 148 (LED1), the anode of which is connected through resistor 150 (R10) to a voltage source Vcc. The base of transistor 146 is coupled through resistor 152 to the Buzz output of IC3.

Shown in FIG. 4 is the state transition diagram of the State Machine 1 used to qualify the DTMF sequence for activating a pager 50. In the upper right corner there are listed the inputs and the corresponding state variables or outputs. Below that at "Note 1" in the upper right corner of FIG. 4, there is a table showing the telephone instrument keypad designation with its corresponding code which appears at outputs Q0–Q3 decoder 106. These include the numerals "0" through "9" as well as the star (*) and pound (#) symbol keys. Certain qualifying conditions for the state transitions are set forth at the right of the drawing identified as "Note 2".

Each state in the state transition diagram is represented by a circle with a number of arrow headed lines that point out, point in, or both. Each circle is divided by a horizontal line, the upper half containing the name of the state, nominally represented by one or more alphanumeric characters, while the bottom half shows the corresponding state variable values of the state in binary form. Using the circle "B1" as an example, the state variables SV3, SV2, SV1, and SV0 should have values "1", "1", "1", and "0", respectively, as shown by the "1110" in the lower half of the "B1" circle.

The DTMF decode table of Note 1 is reproduced herein for reference purposes.

| Q3 | Q2 | Q1 | Q0 | KEY |
|---|---|---|---|---|
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 0 |
| 1 | 0 | 1 | 1 | * |
| 1 | 1 | 0 | 0 | # |

The State Machine 1 is realized by IC2 120 with four of the eight registers contained within IC2. Each register becomes a state variable of the State Machine. The IC2 of sequence Verifier 72 in this embodiment is a programmable array logic PALCE16V8 which contains eight registers and other combinational logic. The State Machine 1 consists of 16 states and they are named as "A", "B1", "B2", "C1"–"C4", and "E" through "M" (excluding "L"). The state "A" is nominally the idle state. It goes to state "C1" when a "#" is received or "B1" if a "#" is received, and if the A_M signal is not asserted. At state "C1", a subsequent "#" will bring the State Machine to its "C2" state where it will stay as long as the subsequent DTMF signals are "#'s". At the "C2" state, the State Machine 1 also selects the first digit of the AID as its input to compare with the next DTMF signal. The first digit of AID is the AID1 that consists of four bits settable by four toggle switches: AID13, AID12, AID11 and AID10 (See FIG. 3). If it is a match, the State Machine 1 advances to the state "C3" and, in the meantime, selects the 2nd digit of AID for comparing with the next DTMF signal. The second digit of AID is the AID0 that consists of four bits settable by four toggle switches: AID03, AID02, AID01 and AID00. If it is a match again, the State Machine 1 advances to the state "C4" where it selects the RID for comparing with the next DTMF signal. The RID is settable by four toggle switches: RID3, RID2, RID01 and RID0. If the compare matches again or the next DTMF signal is a "9" for broadcast, the State Machine 1 goes to the "E" state. The "E" state can also be reached from the transition path from state "B1" to "B2". The State Machine 1 will stay at "B2" state as long as the subsequent DTMF signals are all "#'s". At state "B2", it selects the RID for comparing with the next DTMF signal and advances to state "E" if either there is a match or the received DTMF signal is a "9" for broadcast. At state "E", there is no more comparison. If the next DTMF signal is a number from "0" to "5", the State Machine 1 goes to state "F" through "K", respectively. If the next DTMF signal is a "9", the State Machine goes to State "M". If any of the conditions described above was not met, the State Machine 1 goes to one of the three states: "A", "C1" or "B1" depending on the offending DTMF signal. As listed in Note 2 in FIG. 4, the State Machine 1 goes to "C1" if the DTMF signal is "#", "B1" for "#" or "A" for "0"–"9".

Once the State Machine 1 reaches one of the seven states: F, G, H, I, J, K or M, the signaling part of the pager is enabled and controlled by State Machine 2, 3, and 4. These three state machines are synchronous ones whose state transitions occur on the rising edge of the clock input to IC5, i.e., on pin 1. The state machine 1 uses three registers and their outputs are labeled as SC1, SC2 and SC0. The state machine 2 uses two registers as RC1 and RC0. The state machine 3 also uses two registers and outputs as CC1 and CC0.

State Machine 2 has a total of eight states: "P", "Q1", "Q2", "Q3", "R1", "R2", "S" and "T", as shown in FIG. 5; and it controls the formation of signals depending on which of the seven states the State Machine 1 ends in. But the actual duration of signal and silence is timed by State Machine 3. SM3 has three states: "W1", "W2", and "W3" as shown in FIG. 6 and it performs a countdown function on an interval of 125 milliseconds. It can be entered at any of these three states and each assertion of the CLK to IC3 counts down of one 125-millisecond period. The countdown ends when the state "W3" is reached. So when entered at "W1", this will be for three periods, at "W2" for two periods and at "W3" for one period. And it is only after the "W3" state has been reached, an enabled SM2 may make a state transition at the next CLK transition (if it is not in the "P" state. State Machine 4 has four states: "W4", "W5", "W6" and "W7" as shown in FIG. 7 and is used to count the number of repeat cycles. It works with the similar countdown principles but it counts the number of time the "Q3" state of SM2 is reached. It is always entered at "W4" for three cycles of countdown which ends at "W6". However, at "W6" state, the SM4 may either end the countdown by going into state "W7" or re-enter the "W4" for non-stop countdown depending on the signals to be delivered. In the preferred embodiment, the SID #9 is considered as the emergency signal. So when the SM1 ends at state "M" for delivering signal #9, the SM4 will go into the non-stop countdown operation. Otherwise, it will automatically stop at "Q3" the third time.

The BUZZ signal of IC3 is the final product of the Signaling Control 82 function. When the SM2 is in R1 and R2 states, the BUZZ signal is a result of logically AND'ing the OSC1 signal with the 8 Hz signal. When the SM2 is in either the "S" or the "T" states, the BUZZ signal is the result of the logically AND'ing of the OSC1, the OSC2 and the 8 Hz signals to IC3. The BUZZ signal is in the inactive state when the SM2 is not in the "R1", "R2", "S" and "T" states. The BUZZ signal is then used to drive the transducer which consists of the amplifier circuitry, a light emitting diode LED1 and a buzzer B1. The amplifier circuitry is made up of a PNP transistor Q1 configured as an emitter follower for driving the buzzer. R11 is a variable resistor that is used to control the volume of the buzzer by changing the amount of current into the buzzer B1. R10 is the collector resistor that is picked to supply the proper amount of current for driving LED1.

The work of the Signaling Control function of one cycle may be illustrated with an example on what happens when the SM1 ends at the state of "H". The state transitions in SM2 will be like "P">"R1">"Q1">"T">"Q3". The "P" state is the idle state of SM2 and produces no signal. When the "R1" state is entered, in conjunction with the SM3, it produces 6 consecutive 62.5-millisecond periods of 2 KHz buzz. Both the "Q1" and "Q2" states produce six consecutive 62.5-millisecond periods of silence in conjunction with the SM3. The "T" state when entered, in conjunction with SM3, produces one, two or three 62.5-millisecond chirping signals of mixed 2 K and 500 Hz with 62.5 millisecond duration depending on whether the ending state of SM1 is "G", "H" or "I", respectively. Between each two 62.5 millisecond chirping sound there is a period of 65 milliseconds of silence. Since, in this example, the ending state of SM1 is "H", the SM3 will be entered at "W2" that results in two periods of countdown which produces two of those chirping signals. Symbolically, this pager signal just described may be represented as shown below:

BBBBBBssssssCsCsssssss where each letter 'B', 'C' and 's' represents a signal with duration of 62.5 ms; and where 'C' is a mixed 2 KHz & 500 Hz signal;

'B' is a 2 KHz sound signal and

's' represents no sound or a silent period.

In this preferred embodiment, there are seven Signal ID's (SID's) that define seven different signals for generation. Categorically, they can be divided into three types. The first type is meant to be a simple signal similar to the ringing signal of a telephone. The second type indicates some kind of emergency. The third type contains some counting information and there are five of them providing counting from 1 to 5. They can be used to convey special meanings to different parties.

Shown below are the seven signals provided by this embodiment.

| | | |
|---|---|---|
| S = 0: | Signal #0: | CsCsCsssssssCsCsCsssssss |
| | SM2:P-> | S -> Q1    T-> Q3 |
| S = 1: | Signal #1: | BBBBBBssssssCsssssss |
| | SM2:P-> | R1-> Q1    T>Q3 |
| S = 2: | Signal #2: | BBBBBBssssssCsCsssssss |
| | SM2:P-> | R1 -> Q1    T-> Q3 |
| S = 3: | Signal #3: | BBBBBBssssssCsCsCsssssss |
| | SM2:P-> | R1 -> Q1    T->   Q3 |
| S = 4: | Signal #4: | BBBBBBssssssCsCsCsssssssCsssssss |
| | SM2:P-> | R1 -> Q1    S -> Q2-> T>Q3 |

-continued

| | | |
|---|---|---|
| S = 5: | Signal #5: | BBBBBBssssssCsCsCsssssssCsCsssssss |
| | SM2:P-> | R1 -> Q1 S -> Q2 -> T-> Q3 |
| S = 9: | Signal #9: | BBBBBBssssssBBBBBBssssss |
| | SM2:P-> | R1 -> Q1    R2 -> Q3 | where the duration of each 'B', 'C' and 's' is 62.5 ms; each 'C' is a mixed 2 KHz & 500 Hz sound; each 's' represents no sound or silent period; and each 'B' represents a 2 KHz sound.

The six consecutive "B" signals are intended to be an alert signal. It is either followed by a different numbers of "C" signals as Signal #1 through #5 shown or by another six consecutive "B's" as Signal #9. When used in Signal #1 to #5, the following "C's" varies in number based on the numeral number. In other words, Signal #1 has one "C", #2 has two, so on and so forth. A long silent period breaks up "C's" and "B's" such that no more than three "C's" and no more than six "B's" can be consecutively delivered to facilitates counting. In the preferred embodiment, All except signal #9 will automatically stop after being sent three times. Since the signal #9 is considered to be an emergency signal, it will not automatically stop until another DTMF tone is received. In this embodiment all the signals can be stopped at any time during delivery if another DTMF signal is received.

Figure 8:
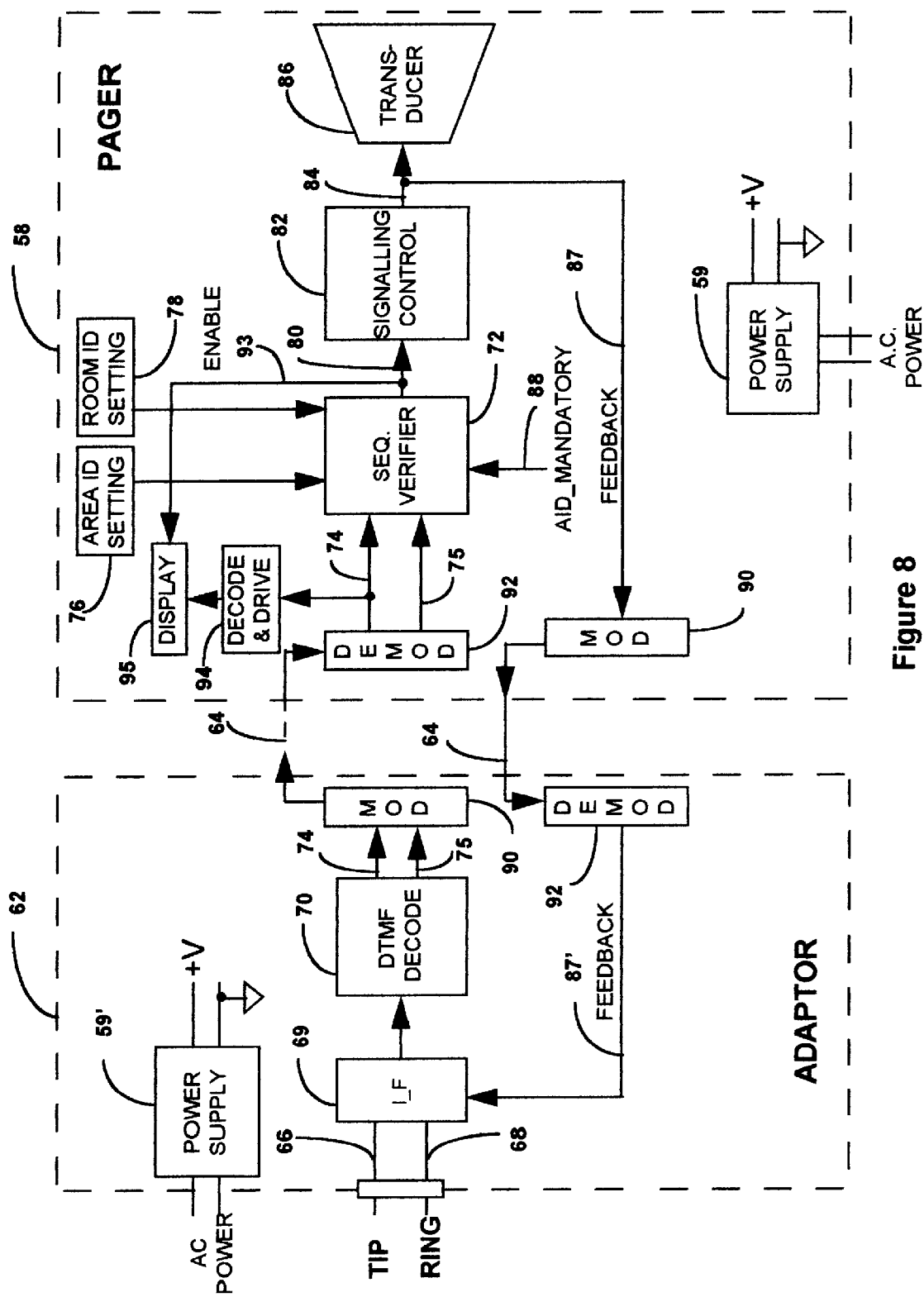
FIG. 8 is a block diagram of another embodiment of a pager device, including an adaptor that re-transmits decoded DTMF signals onto another medium, such as household AC power wires.

Referring now to FIG. 8 which shows another embodiment of pagers as 58 shown in FIG. 1 that allows it to be connected to a different transmission medium, for example, the household AC power lines, and be activated through the use of an adaptor 62 shown in FIG. 1. The adaptor 62 has to be connected to the phone line and converts the DTMF signal into another form (modulated FM or FSK signals, for example) for re-transmission onto the medium. In this embodiment, the adaptor 62 uses the same Interface Function as 69 shown in FIG. 2 to interface with the phone line 66 and 68. The received DTMF signal is converted to 4-digit codes by the same DTMF decode function 70 shown in FIG. 2. The decoded DTMF signal is then serialized and transmitted through a modulator (MOD) 90 shown in FIG. 8. The modulator can be an IC device used normally in digital data communication such as MT8840 provided by Mitel. The same MT8840 device can be employed as the demodulator 92 shown in FIG. 8 that converts the serialized data back into 4-digit DTMF codes for the same Sequence Verifier as 72 shown in FIG. 2. The verified DTMF sequences with matching AID and RID provided by 76 and 78 on FIG. 8, respectively activates the pager for delivering the signal specified by the SID received as described before for Signaling Control 82 and transducer 86.

Figure 9:
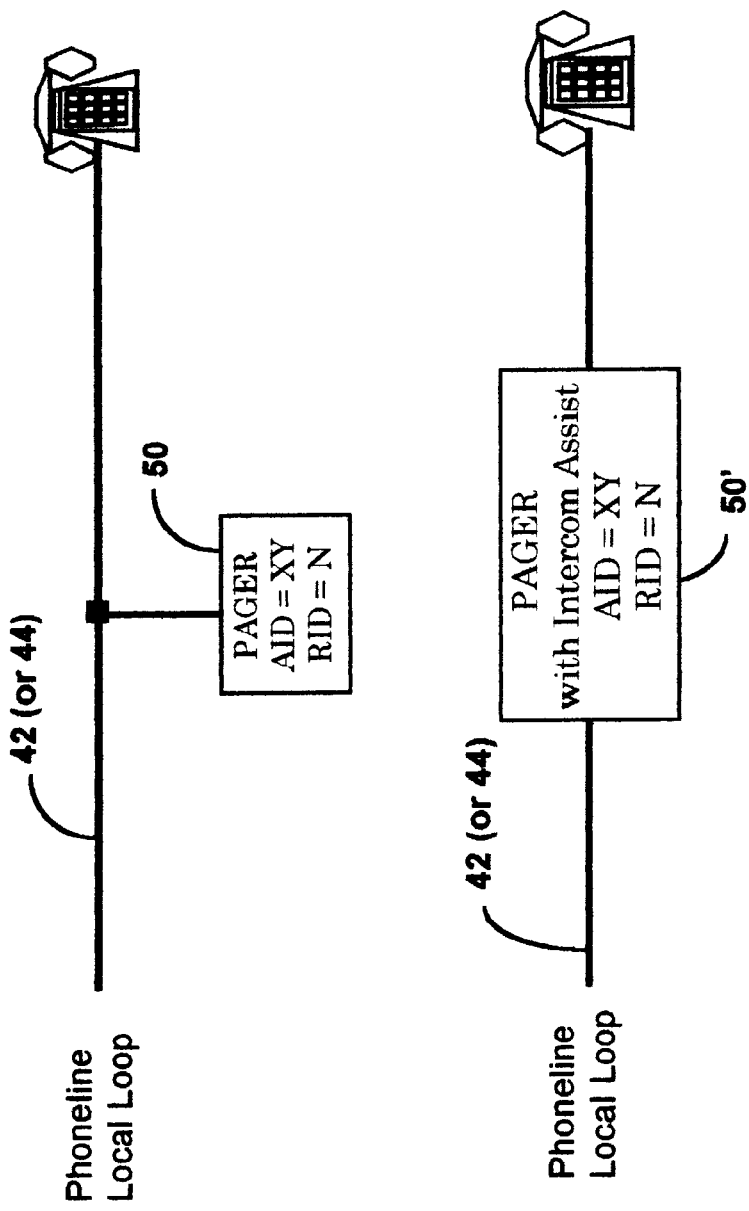
FIG. 9 is a connection block diagram of yet another embodiment of a pager device, including a function for intercom assistance.

Referring now to the "Intercom Assist" function and its preferred embodiment, FIG. 9 shows a connection diagram of telephone equipment relative to a pager with and without the "Intercom Assist" function. The pager 50 without the "Intercom Assist" connects to the phone line in the parallel with the telephone equipment as shown in the top drawing of FIG. 1. The pager 50 equipped with the "Intercom Assist" has the telephone equipment connected to the phone line through the pager as shown in the bottom drawing in FIG. 9.

Figure 10:
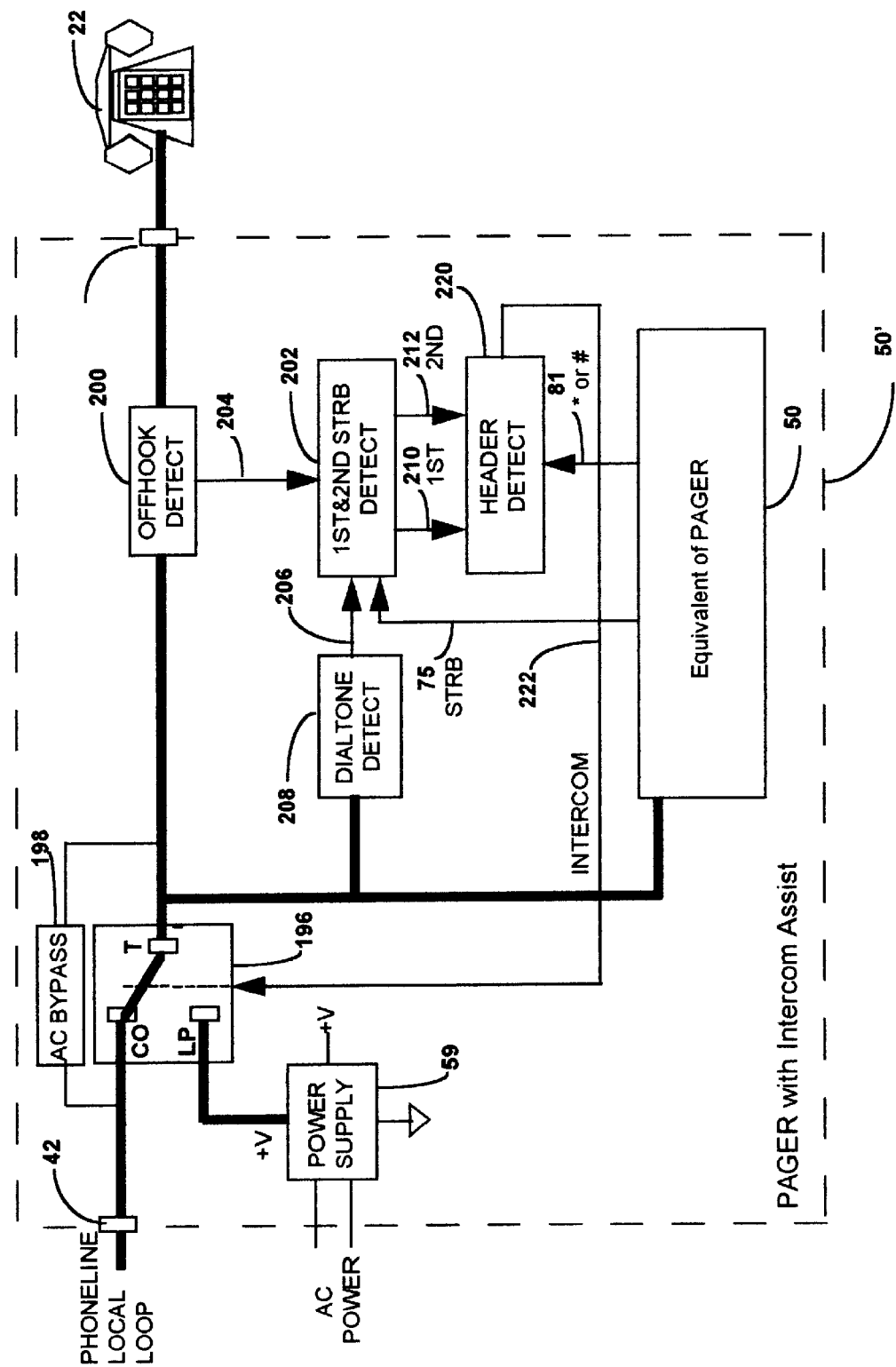
FIG. 10 shows functional block diagrams depicting the connections of the embodiment of FIG. 9 to the embodiment of FIGS. 1 through 7.

Referring now to FIG. 10, there is shown a functional block diagram of a pager, designated 50', that provides the "Intercom Assist" function. The previously described pager 50 is enclosed within the broken lines and generally designated 50. This functional block diagram only shows the details related directly to the "Intercom Assist" portion. The remaining portion that is generally identical to the pager 50 without the "Intercom Assist" described earlier and is shown only as the block designated 50. Provided in the "Intercom Assist" is the ability to automatically put the phone equipment connected through the pager 50' back into the on-hook condition when the intent of intercom usage is detected. The detection is accomplished by first sensing two conditions, that both the telephone is off-hook and the dial tone is present. This combination indicates that the connected phone is the first phone off-hook in the local loop because of the presence of the dial tone. Normally, it is going to originate either a phone call/service request through the CO or an intercom with another party on the local loop. The dialing sequence for a CO connection or service will be either a string of numbers from 0–9 or a header consisting of one "*"/"#" followed by two numbers between 0 and 9, inclusive. For initiating an intercom using the present invention, the header designated for this purpose is different from both of them, thus it can be used to distinguish an intercom call from a central office call by detecting whether the first two DTMF signals constitute a header or not.

From the phone line local loop, there is provided a switch block 196, with a first terminal CO, for connection to the central office, this being the normal or default position. The second terminal of the switch 196 is designated LP for local power from the normal household outlet through power supply 59. An AC bypass is provide from the phone-line local loop 42 to an Off-hook Detector 200. The Off-hook Detect function 200 shown in FIG. 10 is in the path through which the phone is connected. Thus it can sense the local loop current when the phone becomes off-hook and delivers an "Off-hook" signal to the 1ST&2ND STRB Detect block designated 202 by way of line 204. The block 202 also receives a signal 206 delivered by the Dial-tone Detect block 208. The signal 206, when asserted, indicates the presence of a dial tone. If both signals on lines 204 and 206 are present, it indicates that the phone is off-hook, and the connection with the CO has not been established. After receiving the Off-hook signal via line 204, the 1ST&2ND STRB block 202 asserts the 1ST signals over lead 210 when it receives the first STRB signal 75 from the "Equivalent of PAGER" designated 50. If, and only if, the dial tone is detected when the first STRB was received, the 2ND signal 212 will be asserted when the second STRB signal 75 is received at strobe detection block 202. Once the first and the second STRB signals are received after an off-hook state is detected, the 1ST&2ND STRB Detect block 202 enters an inactive state until it is reset by an On-hook state detected on the local loop.

The 1ST and 2ND signals 210 and 212 are used by the Header Detect block 220 to detect whether the companion first and second DTMF signals are the headers used in this embodiment or are not using the *OR# signal 81 provided also by the pager block 50. In the preferred embodiment, the Header Detect function 220 treats any of the four combinations "#*", "##", "*#" or "" as a header to facilitate the enabling of the Intercom Assist mode. Thus, when any of the four combinations is detected, the Header Detect block 220 asserts an INTERCOM signal 222 which subsequently changes the connection in the switch block 196 from T-CO to T-LP. The connection change allows the pager 50' to supply power to the phone equipment through the T-LP connection and, in the meantime, remove the phone DC-wise from the telephone local loop 42, in other words, back to the On-hook state. Since the telephone 22 is back to the On-hook state, the CO then will not send any of those voice message beeps. To allow this phone line local loop to carry the DTMF sequences for activating pagers and voice signals for intercom, a non-DC path has to exist. The AC Bypass block 198** is provided as the AC bypass path to fulfill that purpose.

Figure 11:
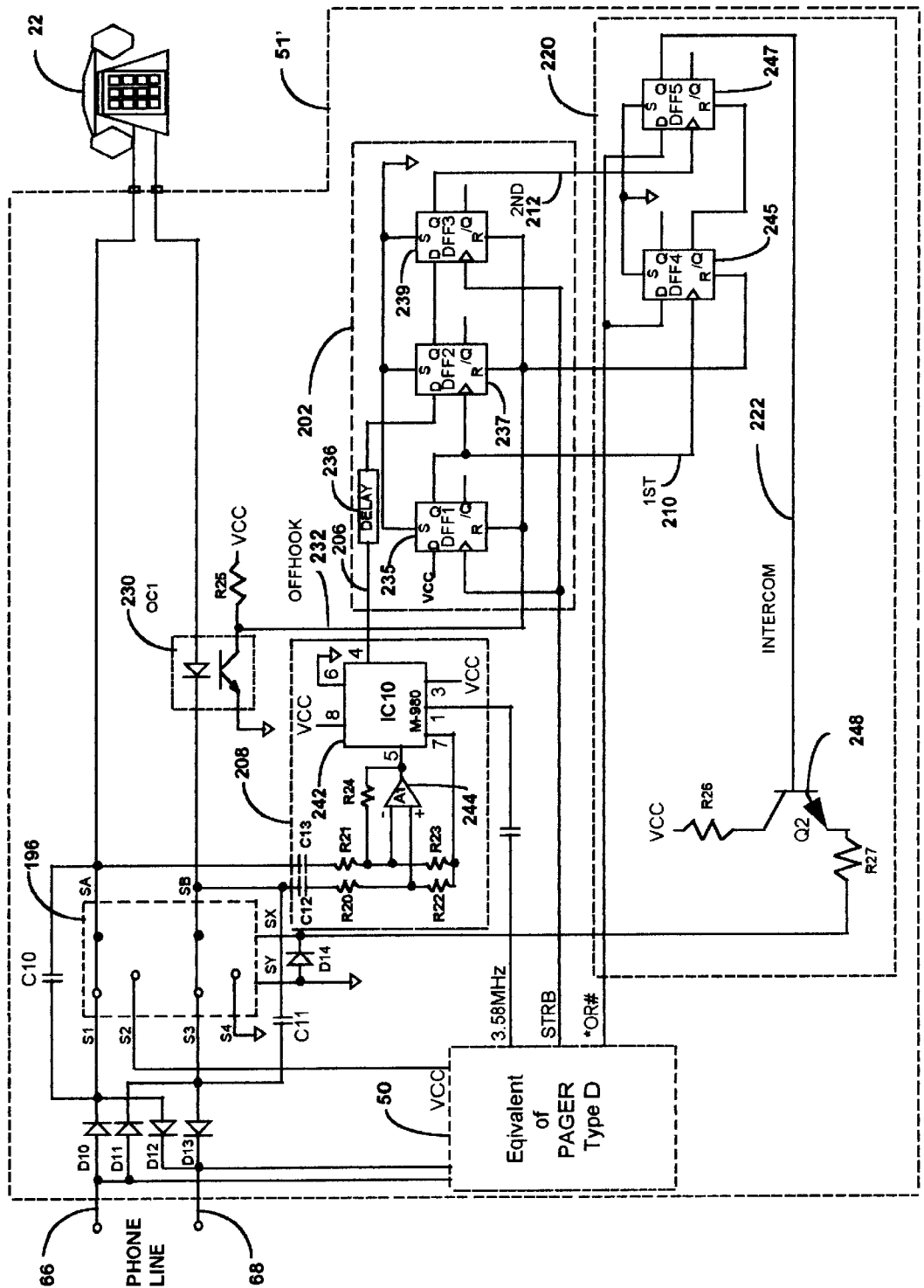
FIG. 11 is a schematic diagram of the embodiment of FIG. 9.

Shown in FIG. 11 is the detailed schematic diagram for the block diagram shown in FIG. 10. An optical-coupler 230 is used to sense the off-hook condition of the telephone instrument 22. Other devices such as balanced coils may also be used to perform this off-hook detection function. When the phone 22 is on-hook, there is no local loop current, and the optical-coupler is in the off-state. Thus, the OFF-HOOK signal on lead 232 is pulled up by resistor R25 to high such that all the D flip-flops: DFF1 235, DFF2 237, DFF3 239, DFF4 245 and DFF5 247, are held in the reset mode, i.e., their Q outputs are low and Not Q outputs are high. But, whenever the telephone instrument 22 becomes off-hook, the loop current flows through the photodiode of coupler 230 which subsequently turns the coupler 230 to its on-state. The on-state of the coupler output brings the OFFHOOK signal on lead 232 to its low level which effectively leaves the flip-flops DFF1, DFF2, DFF3 and DFF4 in the ready state that allows their clock input to change their state according to the respective D input. When the first STRB signal 75 is received, the DFF1's Q output, i.e. the 1ST signal 210, changes from low to high since its D input is set to Vcc level, i.e. the high level. Also, this transition happens only once for each Off-hook duration. As shown in FIG. 11, the 1ST signal on lead 210 is also the clock signal to both the DFF2 and the DFF4 flip-flops. So at the one and only low-to-high transition of the 1ST signal 210, it determines two conditions via the two D-type flip-flops, DFF2 and DFF4. One condition uses the DFF2 to capture whether the dial tone is present from the detector 208 after the off-hook. The circuitry consisting of capacitor C12 and C13, resistors R20–R25, op-amp 244 (A1) and circuit 242 (IC10) is used to detect the presence the dial tone on the local loop. Pin 4 of IC10 is an output signal designated 206 that becomes high level when the dial tone is detected. Since the CO will turn off the dial tone once a DTMF signal is received, the delay circuit 236 in series with the signal on lead 206 to flip flop 237 (DFF2) provides enough delay such that the state of the signal 206 can be captured at the low-to-high transition of the 1ST signal. In the meantime, the DFF4 is used to capture the other condition, i.e., whether the first DTMF signal is a "*" or a "#" from the header detect circuit 220. If the dial tone was not present and was captured by DFF2 with its Q output staying at a low level, the 2ND signal will never be activated by the DFF3 in this particular off-hook period. Thus detection of the header becomes impossible. However, if the dial tone was present and captured by DFF2, then the next STRB signal will assert the 2ND signal 212 at the Q output of the DFF3. If the Q output of DFF4 is high, i.e., D is low, the DFF5 is no longer in the reset state since the Not-Q output of DFF4 is at its low state, thus it can be clocked by the 2ND signal 212. Should the *OR# signal be detected and asserted at its high level when the 2ND signal is asserted, the DFF5 captures the condition that a header is detected by setting its Q output, i.e. the INTERCOM signal on lead 260 (from the Q output of flip-flop 247), to the high state. The transistor circuitry including Q2, R26, R27 and D14 forms an emitter follower circuit to drive a double-pole-double-throw relay of the switch circuit 196. In the normal telephone mode, the relay switch 196 provides connections between SA and S1, also SB and S3 as shown in FIG. 11. When the intercom mode is detected, the connections provided by the relay switch 196 will be changed from SA-S1 and SB-S3 to SA-S2 and SB-S4. The new connection breaks the DC connection between the telephone instrument 22 and the CO. Instead, the power required by the telephone instrument 22 is supplied by the pager power Vcc through S2 using the S4 for common ground. The capacitor C10 and C11 are used to provide the AC connection between the telephone equipment 22 and the rest of the local loop where other telephones are connected so the intercom may be carried out.

After the intercom conversation is completed and the telephone is back to its on-hook state, the OFFHOOK signal on lead 232 becomes inactive, i.e., it returns to its high state. This high state resets DFF1 through DFF4 directly, and DFF5 indirectly. Thus the INTERCOM signal on lead 260 from DFF5 is reset to the low state that returns the relay switch 196 back to the S1-SA and S3-SB position. The telephone is then back to its normal connection to the local loop. This automatic detect and switch embodiment may be replaced with a mechanical switch. The AC bypass path is still needed when the telephone is switched from the local loop to the pager. However, if a mechanical switch is used, and if the switch is not returned to its normal phone position, the telephone will not function normally on the phone line local loop. For a mechanical switch, the system includes an alert mechanism (not shown) to remind the user to replace the switch back to telephone mode after use of the intercom function. It is accomplished by sensing the switch location and absence of the loop current when the loop current becomes absent and the switch is in the Intercom mode position. An audible tone may be generated to alert the user to indicate that the intercom function has ended with the switch left in the intercom position.

Figure 12:
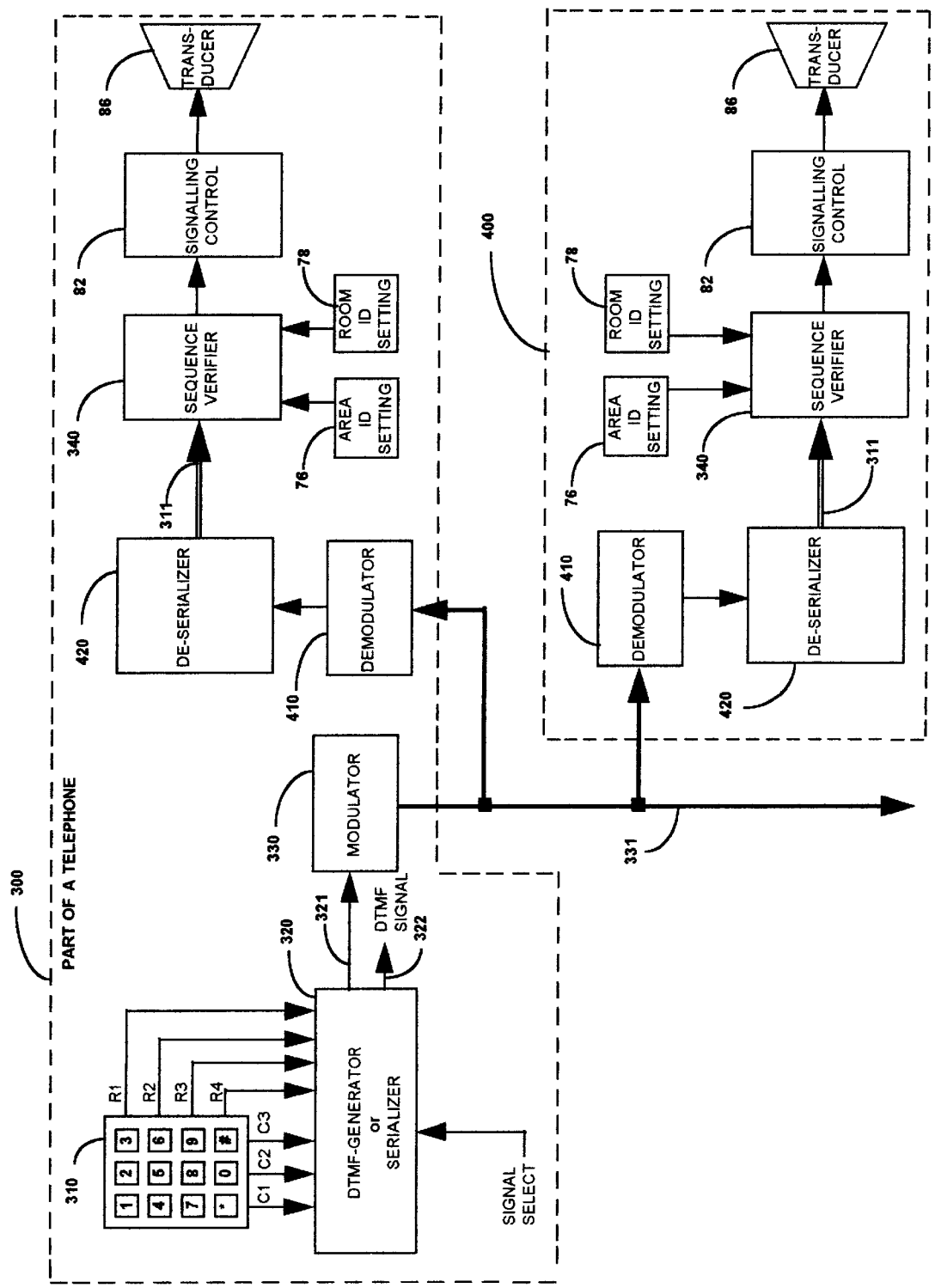
FIG. 12 is a block diagram of an alternative embodiment of a pager according to the invention built into a telephone instrument.

Referring now to FIG. 12, there is shown a block diagram of the pager of the instant invention built into a conventional telephone instrument, so that the telephone becomes individually addressable. In this case, the telephone becomes part of the system and may be altered to provide other features. FIG. 12 is an embodiment that provides an alternative to the DTMF signal as the means of transmitting the dialing sequence. In this embodiment, the telephone allows selection of translating a key pressed on the telephone keypad as either a DTMF signal or a possibly serial signal modulated onto a carrier frequency. When the telephone is used as a regular phone, the DTMF signal is selected and sent when the key is pressed. But, when the telephone is used for activating a pager, the modulated signal is selected for transmission. The advantage of this approach is that, when the modulated signal is made non audible, the dialing sequence sent will not annoy or confuse other people on the same phone line.

In FIG. 12, the block designated as 300 is part of a telephone that contains the telephone keypad designated 310. A regular telephone keypad consists of twelve keys and nominally outputs seven signals: R1–R4 and C1–C3. When a key is pressed, two signals will be asserted to uniquely identify the key. For instance, a "2" key will be represented by asserting R1 and C2 signals. The rectangular block named "DTMF-Generator or Serializer" 320 is used to either generate a DTMF signal or convert the output signal of the keypad 310 into a serial signal stream depending on the Signal Select input. The serial digital signal is meant for being modulated by the Modulator block 330 for transmission to the transmission medium 331. If the transmission medium is the phone line, then the DTMF signal when selected will also be transmitted on it. However, the modulated signal may be transmitted on other media such as the household AC power line. Certainly, the coupling of this modulated signal to the AC power line has to be safe to the telephone line and users.

A simplified block diagram of a standalone pager is also shown in FIG. 12 in the block designated 400. The pager 400 first has to reverse the process that transforms the keypad input into signal transmitted onto the medium. That is done by the Demodulator box designated 410 and the De-Serializer box designated 420. The output 311 of the De-Serializer 420 should be representative of the key pressed on the keypad. The actual representation could be in the form of either the seven output signals of a keypad or their equivalent such as the DTMF codes shown as Note 1 in FIG. 4. Then, this output is fed to the Sequence Verifier 340 for verifying the received dialing sequence as described previously, including the Area ID Setting 76 and the Room ID Setting 78 as part of the verification process. A verified sequence causes the Sequence Verifier 340 to output signals that enables the Signaling Control block 82 to produce the designated pager signal through the Transducer block 86. Also shown in FIG. 12 are inclusions of the above function blocks in a telephone such that it can also be activated as a pager.

While there has been shown and described a telephone pager system with intercom functions, in accordance with preferred embodiments, it is to be understood that various other adaptations and modifications may be made within the spirit and scope of the invention.

What is claimed is:

1. A pager for use with a telephone system having tip and ring wires providing coupling between a central office and a plurality of pagers, each said pager comprising:

an interface for coupling said pager to said tip and ring wires in a fixed AC coupled relationship;

a dual tone modulation frequency (DTMF) unit communicatively coupled with said interface, and being responsive to a header sequence including at least two symbolic characters for enabling each of the pagers in the system to respond to a pager system sequence without completing contact with the central office, said pager system sequence including, a first pager ID sequence specifying a particular one of a plurality of different groups of the pagers, a second pager ID sequence specifying one of the pagers in said specified group to be activated or all of the pagers in said specified group to be activated in a broadcasting mode, and a tone ID sequence identifying a specified audible tone to be generated at said specified pagers in said specified group;

said DTMF unit being operative to provide a first received ID value indicating said specified group of pagers, a second ID received value indicating said specified pagers in said specified group, and a received tone ID value identifying said specified audible tone;

a signal controlling unit for generating a plurality of different audible tone signals;

a first ID setting unit providing a first local pager ID value indicating a local group of pagers including said pager;

a second ID setting unit providing a second local pager ID value indicating said pager, and also providing a broadcast ID value indicating all of the pagers in said local group;

a sequence verification unit communicatively coupled with said signal controlling unit, said sequence verification unit being responsive to said first and second received ID values, to said received tone ID value, to said first and second local ID values, and to said broadcast ID value, said sequence verification unit being operative to compare said first received ID value with said first local ID value to determine if said pager is included in said specified group, and to compare said second received ID value with said second local ID value and with said broadcast ID value to determine if said pager is one of said specified pagers in said specified group, and to provide said received tone ID value to said signal controlling unit if said first received ID value matches said first local ID value and said second received ID value matches either said second local ID value or said broadcast ID value;

said signal controlling unit being responsive to said received tone ID value and operative to generate an audible tone signal based on said received tone ID value; and a transducer communicatively coupled with said signal controlling unit for generating an audible tone in response to said audible tone signal.

* * * * *